United States Patent [19]

Maciulewicz

[11] Patent Number: 5,751,572
[45] Date of Patent: May 12, 1998

[54] HVAC COMMUNICATION NETWORK

[75] Inventor: Stephen M. Maciulewicz, Auburn, N.Y.

[73] Assignee: Carrier Corporation, Syracuse, N.Y.

[21] Appl. No.: 670,197

[22] Filed: Jun. 22, 1996

[51] Int. Cl.[6] ............................................. G06F 19/00
[52] U.S. Cl. .................. 364/132; 364/505; 395/200.38; 395/200.75
[58] Field of Search ............................ 364/131, 132, 364/133, 134, 135, 138, 139, 505, 506, 557; 340/825.06, 825.07, 825.08; 395/200.05, 200.14, 200.16, 200.38–200.41, 200.67, 200.75; 370/451, 499, 449

[56] References Cited

U.S. PATENT DOCUMENTS

| | | | |
|---|---|---|---|
| 4,578,538 | 3/1986 | Pascucci et al. | 340/825.08 X |
| 4,949,337 | 8/1990 | Aggers et al. | 370/451 |
| 5,039,980 | 8/1991 | Aggers et al. | 340/825.06 X |
| 5,390,206 | 2/1995 | Rein et al. | 375/200 |
| 5,581,478 | 12/1996 | Cruse et al. | 364/138 X |

*Primary Examiner*—Joseph Ruggiero

[57] ABSTRACT

An HVAC communication network includes one or more master controllers that communicate with their respective zone controllers by issuing broadcast messages over the network. The broadcast messages are read and analyzed by all zone controllers on the network. Each zone controller is able to determine whether a particular broadcast message is intended for it by noting whether the broadcast message contains a particular identification of its master controller.

34 Claims, 7 Drawing Sheets

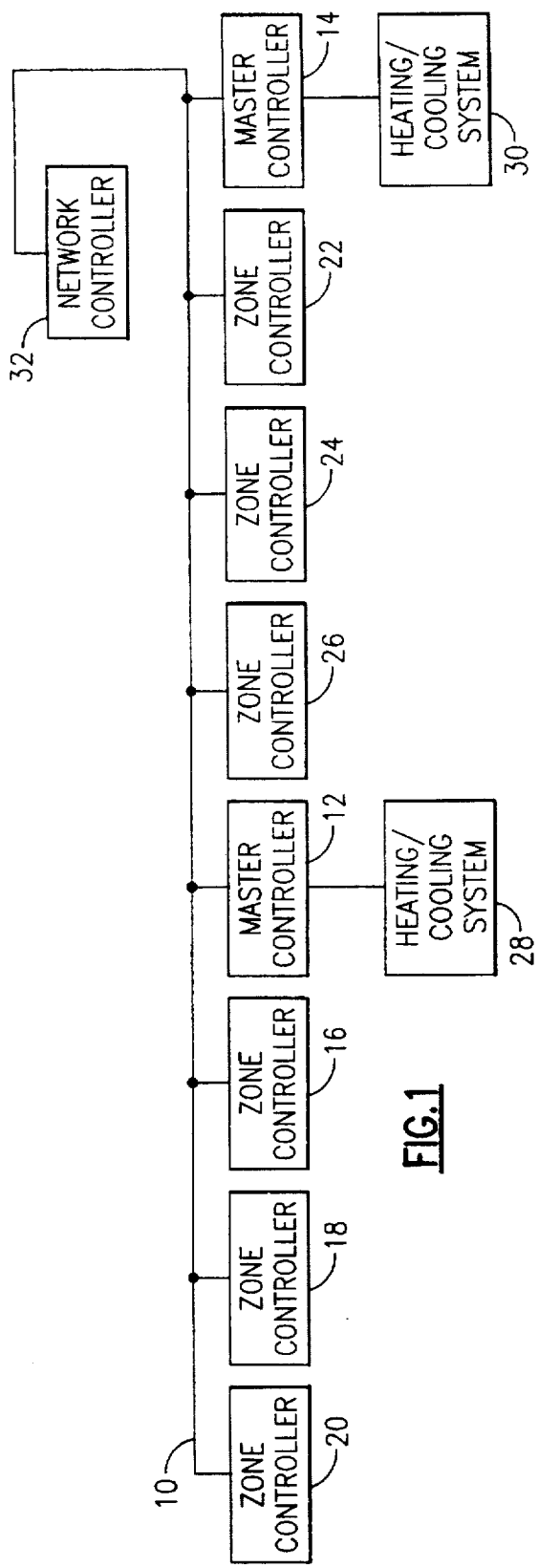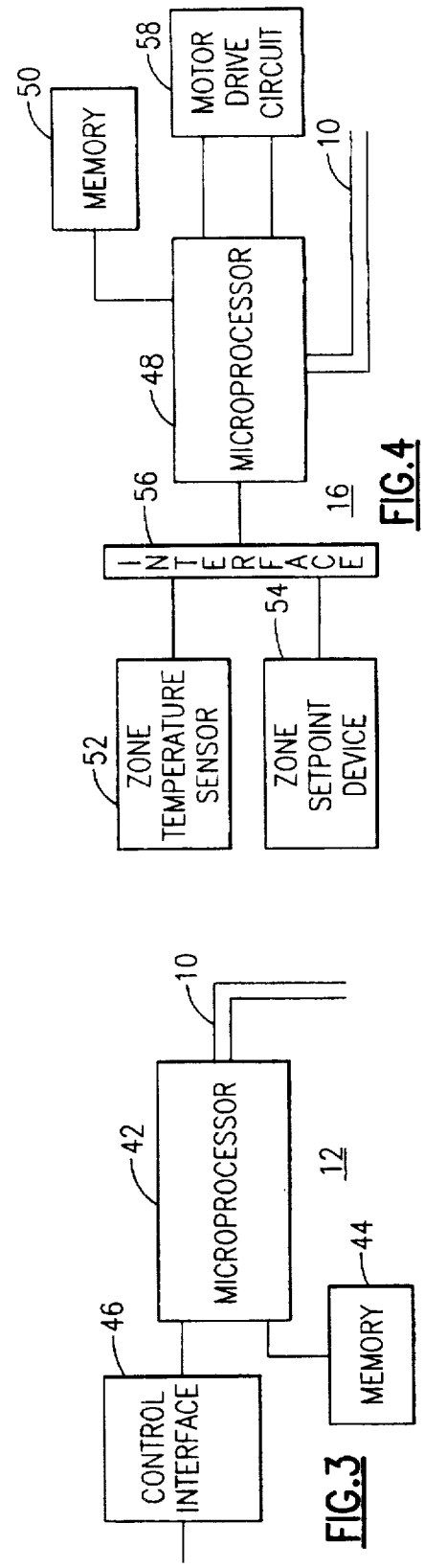

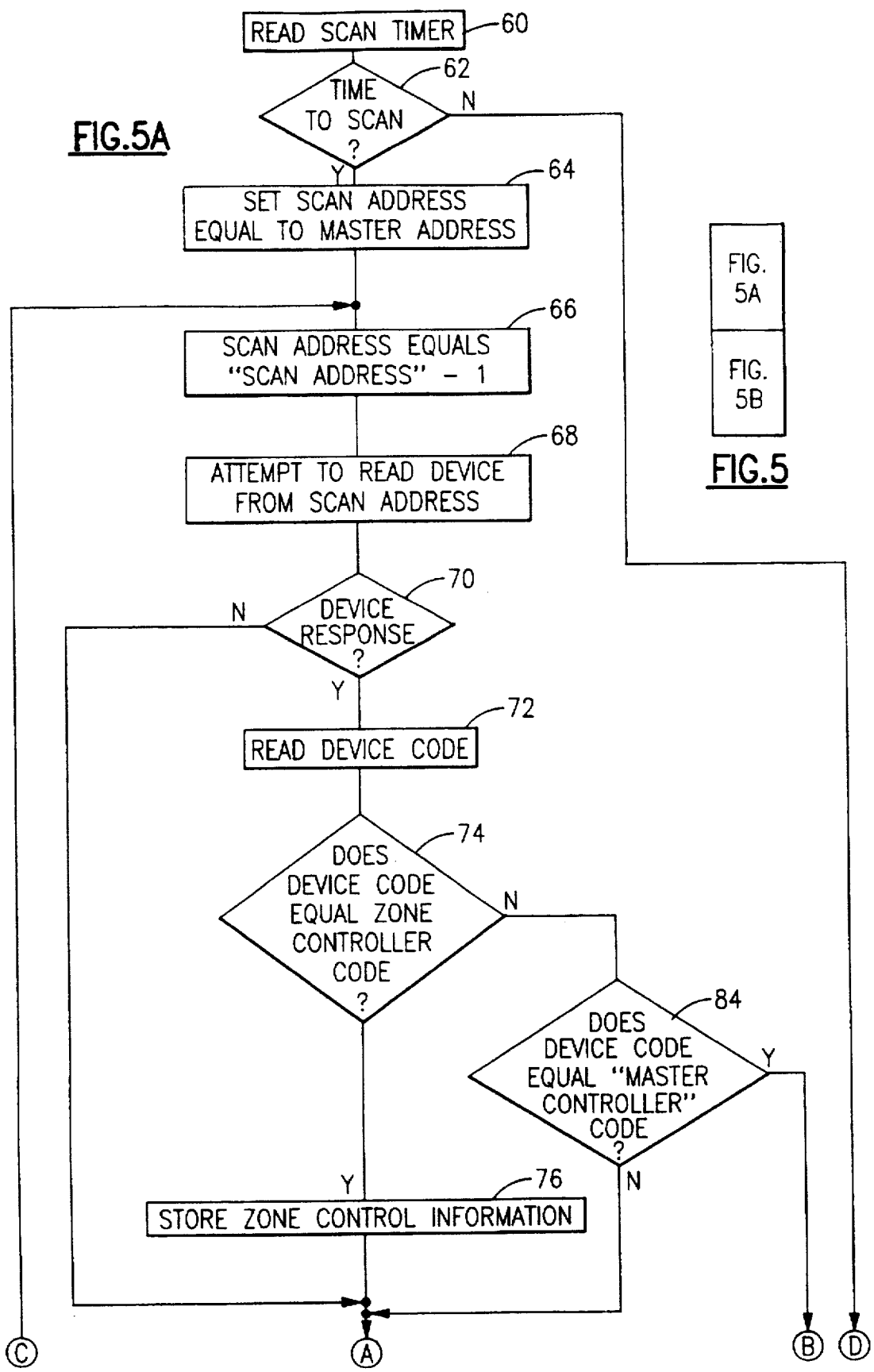

ZONE CONTROLLER DATA PACKET:

MASTER CONTROLLER DATA PACKET:

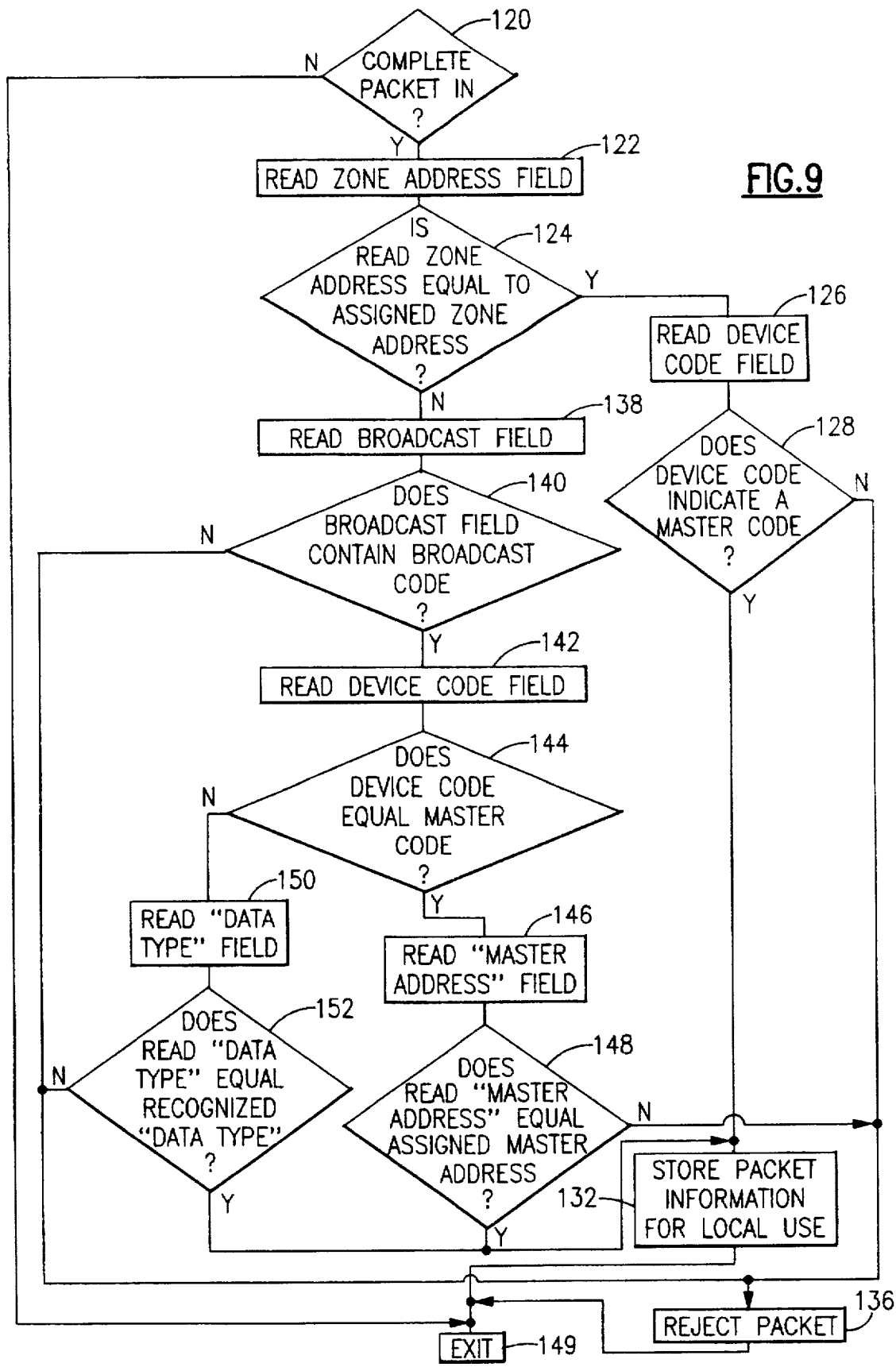

HVAC COMMUNICATION NETWORK

BACKGROUND OF THE INVENTION

This invention relates to the communications that occur between a master controller and its respective zone controllers within an HVAC communication network. In particular, this invention relates to the manner in which communication is established between a master controller and its respective zone controllers within an HVAC communication network that may include a number of different master controllers and respective zone controllers.

Communications between a master controller and its respective zone controllers within an HVAC communication network have heretofore been premised on the master controller addressing and sending the HVAC control information to each of the respective zone controllers on a predictable periodic basis. The master controller usually includes a timing clock that dictates the period during which the master controller accumulates information that is to be provided to its respective zone controllers. The information that is accumulated may significantly impact the manner in which the individual zone controllers function when such information is made available to the zone controllers. It is to be appreciated that the communication of such information may be delayed by as much as a full cycle of the master controller's clock time due to the aforementioned periodic transmission of information to the zone controllers.

The communication by the master controller to the zone controller in existing HVAC communication networks has also heretofore been premised on each zone controller being separately addressed by the master controller when transmission of any information from the master controller is to occur. This communication scheme assures that the last zone controller to be addressed will not receive the information as quickly as the first addressed zone controller.

OBJECTS OF THE INVENTION

It is an object of the invention to provide an HVAC communication system wherein communication of HVAC information occurs on a timely basis between a master controller and each zone controllers associated therewith.

It is another object of the invention to provide a communication protocol between a master controller and its respective zone controllers, which minimizes the amount of time necessary to transmit information from the master controller to the respective zone controllers.

SUMMARY OF THE INVENTION

The above and other objects of the invention are achieved by providing an HVAC communication system with the capability of allowing a master controller in the system to immediately broadcast control information to its respective zone controllers at any time without having to periodically address each zone controller. This is accomplished by allowing a master controller to respond quickly to any messages that may be provided to it from any device within the HVAC communication system. The master controller may also respond to any change in local control conditions that it is directly responsible for. The master controller in each instance is operative to immediately send a broadcast message out over preferably a network communication bus. The broadcast message will reflect either the contents of the message it received that has prompted the broadcast or, in the alternative, a specific change that may need to be made to the operating parameter of zone controllers associated with the master controller. The broadcast message will preferably be in the form of a data packet used by the master controller to convey all types of information to a zone controller. Each zone controller attached to the bus downloads the data packet from the network communication bus and proceeds to check for a master controller identification appearing in the data packet. In the event that the master controller identification within the data packet matches a master controller identification previously stored in the zone controller, then the zone controller will proceed to incorporate any information in the data packet into the control memory for the particular zone controller. In this manner, each zone controller connected to the network communication bus either receives or rejects a particular data packet emanating from a master controller on the network.

BRIEF DESCRIPTION OF THE DRAWINGS

Other objects and advantages of the present invention will be apparent from the following description in conjunction with the accompanying drawings, in which:

FIG. 1 is an overall diagram of an HVAC communication network including two master controllers and several zone controllers associated therewith;

FIG. 3 is a diagram of the microprocessor configuration of a typical master controller;

FIG. 4 is a diagram of the microprocessor configuration within one of the zone controllers;

FIGS. 5, 5A and 5B comprise a flowchart of a software program executable by the microprocessor of FIG. 3, which defines the manner in which communication is established by a master controller with respect to its zone controllers over the communication network set forth in FIG. 1;

FIGS. 9 is a flowchart of a software program executable by each of the zone controllers, which is responsive to the communications issued by the software program of FIGS. 5A and 5B of the respective master controller.

DESCRIPTION OF THE PREFERRED EMBODIMENT

Figure 2:
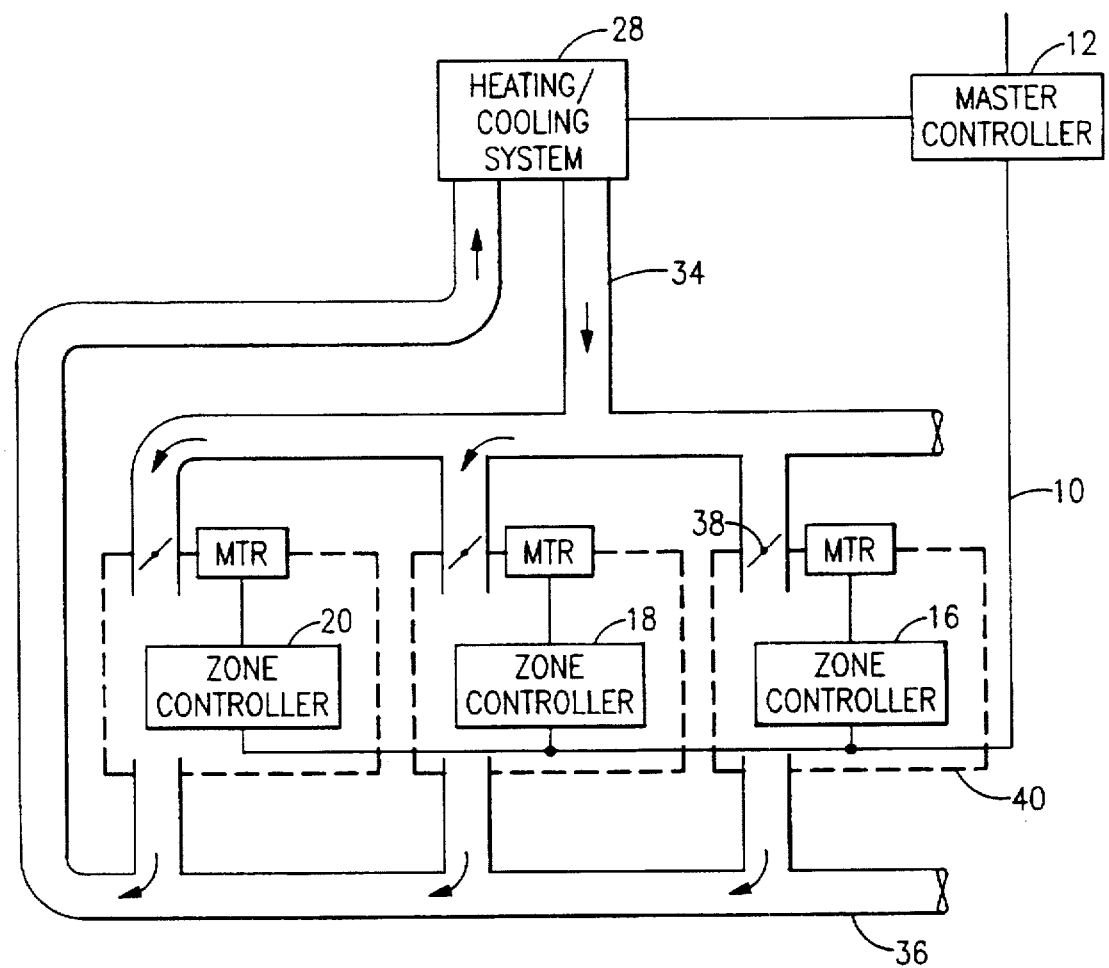
FIG. 2 is a diagram of a particular master controller and its associated zone controllers having dampers within respective zones.

Referring to FIG. 1, a communication bus 10 is connected respectively to master controllers 12 and 14. Each master controller uses the communication bus 10 to communicate with zone controllers associated therewith. In particular, master controller 12 communicates with zone controllers 16, 18, and 20 whereas master controller 14 communicates with zone controllers 22, 24, and 26. Each master controller, 12 and 14, is also seen to be in communication with a respective heating/cooling system 28 or 30. As will be explained hereinafter, the heating/cooling system 28 provides conditioned air to the respective zones of the zone controllers 16, 18, and 20 whereas the heating/cooling system 30 performs the same function for zones associated with zone controllers 22 through 26. Each master controller 12 and 14 also may receive information on the control bus 10 from a network system controller 32. The information from the network system controller may, for instance, include an emergency shut down notification to each master controller on the communication bus 10. Such an emergency shut down notice may, for instance, occur if a fire is detected in the building being heated or cooled by the respective heating/cooling systems 28 and 30.

Referring to FIG. 2, the heating/cooling system 28 is illustrated relative to the master controller 12 and the respective zone controllers 16, 18, and 20. The heating/cooling system provides conditioned air to each zone associated with a zone controller via an air supply duct 34. Each zone is seen to include a passage to a return duct 40, which returns air to the heating/cooling system 28. The amount of conditioned air provided to a particular zone is dictated by the position of a damper in the respective portion of the duct 20 feeding conditioned air to the respective zone. For instance, zone controller 16 controls the position of a damper 38 providing air to a zone 40.

Referring to FIG. 3, the master control 12 is seen to include a programmed microprocessor 42 connected to the communication bus 10. The programmed microprocessor 42 downloads packets of information from the communication bus 10 and stores the same in a memory 46 for further processing. The programmed microprocessor 42 is connected to a control interface 46 which selectively actives the heating/cooling system 28 in response to control signals from the microprocessor 42. The control interface 46 also includes the status of the various functions of the heating/cooling system, which can be queried by the microprocessor 42.

Referring to FIG. 4, the zone controller 16 is seen to include a programmed microprocessor 48, which receives and transmits packets of information over the communication bus 10 to, for instance, the master controller 12. The received packets are normally stored in a memory 50 associated with the microprocessor 48. The microprocessor 48 is furthermore connected to a zone temperature sensor 52 and a zone set point device 54 via an interface 56. It is to be appreciated that the temperature values defined by the zone temperature sensor 52 and the set point device 54 are periodically read and stored for use by the microprocessor 48. In addition to the reading and storing of information from the interface 56, the microprocessor also issues control signals to a motor drive circuit 58 associated with the motor for the damper 38 of FIG. 2. It is to be appreciated that the zone controller configuration of FIG. 4 is similarly duplicated in the other zone controllers connected to the communication bus 10.

Referring to FIG. 5A, a program executable by a microprocessor within a master controller for implementing communications with respect to its zone controllers is illustrated. It is to be understood that such a program would be, for instance, executable by the microprocessor 42 within the master controller 12. The program begins with a step 60 wherein the microprocessor reads a scan timer that has been established for the purpose of defining periodic intervals during which the master controller is going to specifically read information from its respective zone controllers. The microprocessor proceeds to a step 62 and inquires as to whether or not the timer indicates the elapse of the specified scan period. The microprocessor proceeds upon the elapse of the specified scan period to a step 64 and sets a "scan address" equal to the particular master controller's address. This would be the network address of the master controller 12 that is used by other devices on the communication bus 10 for the purpose of communicating with this master controller.

Figure 5B:
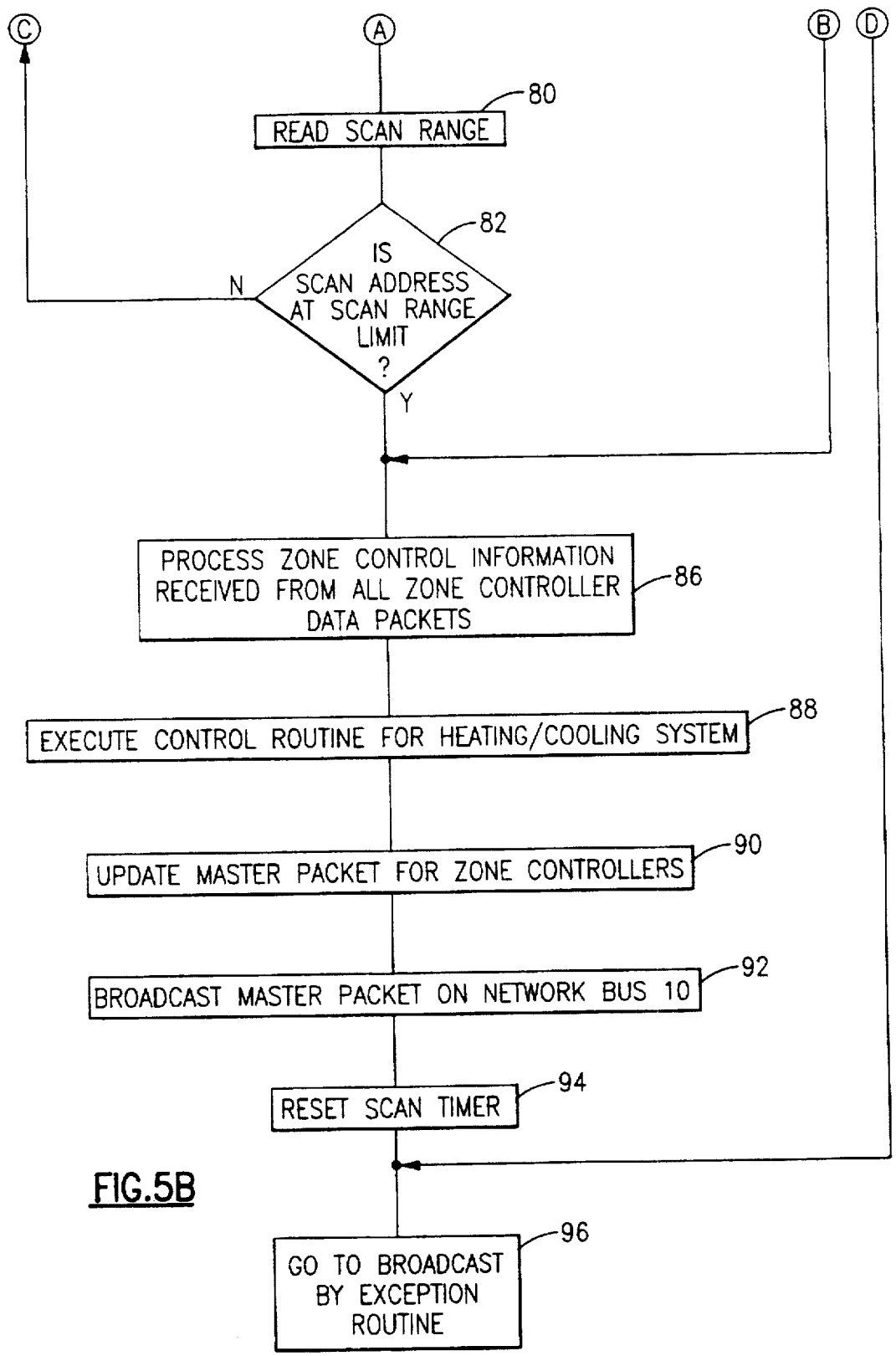
Figure 6:
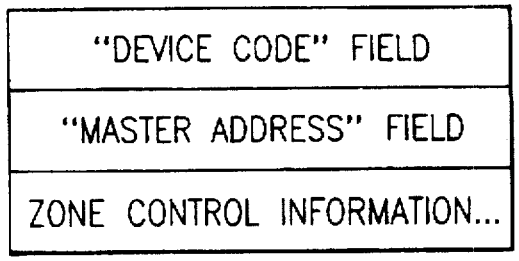
FIG. 6 is an illustration of the configuration of a data packet transmitted by a zone controller over the communication network set forth in FIG. 1.

The microprocessor proceeds in a step 66 to decrement the scan address established in step 64. The microprocessor thereafter attempts a read of any device on the communication bus 10 having the particular scan address. Referring to FIG. 1, it will be remembered that the zone controllers associated with a particular master controller will have lower addresses than their respective master controller. This will mean, for instance, that the zone controller 16 associated with the master controller 12 will be addressed at the next network address down from that of the master controller 12. Referring again to FIG. 5A, the microprocessor within the master controller 12 awaits a device response in step 70. Assuming a device has responded at the particular scan address, the microprocessor will proceed to a step 72 and read a particular device code field of information from a data packet stored in a communication buffer. The communication buffer will preferably be established in a memory such as memory 44 associated with the microprocessor 48. It is to be understood that communication buffers are well known in the art. As will be explained in detail hereinafter, the data packet in the communication buffer will preferably include several fields of information that are to be read and analyzed by the microprocessor within each master controller in the event that the data packet is from a zone controller. An example of how such a zone controller data packet may be configured is illustrated in FIG. 6. The progressive analysis of such a data packet by a master controller's microprocessor will be explained hereinafter.

The microprocessor will proceed in a step 74 to inquire as to whether the read device code field contains a device code that indicates that a zone controller has been addressed. Assuming that the master controller 12 has read a zone controller "code" from this particular field in the data packet, the microprocessor will proceed to a step 76 and both read and store certain zone control information from the data packet. It is to be understood that the zone control information that is stored is preferably zone information such as zone damper position, zone temperature setting and the current temperature of the zone. This information will preferably appear in particular information fields within the data packet. The microprocessor will proceed from step 76 to a step 80 as shown in FIG. 5B and read the scan range for the particular master controller. This scan range will be an assigned scan range for the particular master controller that can be used to compute a minimum address for scanning purposes. In the event that the scan range has not been exceeded, the microprocessor within the master controller will proceed out of step 82 and return to step 66 wherein the scan address is again decremented by one. The microprocessor will thereafter attempt to read a device at the new scan address. If a device is noted, it will read the device code from the particular packet of transmitted information from the addressed device in step 72. The read device code will be checked in step 74 for being a zone controller device code. In the event that the device code does not indicate a zone controller device code, the microprocessor will proceed along a "no" path to a step 84 and inquire as to whether the device code field in the packet from the addressed device indicates a master controller device code. In this regard, the addressing by one master controller of another master controller will cause the latter master controller to provide a data packet of information back to the inquiring master controller that will have a device code field containing a master controller device code indicating that it is a master. In the event that such occurs, the microprocessor for the inquiring master controller will proceed out of step 84 to the step 86. It is to be appreciated that at this point all scanning will have been completed of the zone controllers downstream of the inquiring master controller. Referring again to step 84, in the event that the inquiring master controller has not encountered another master controller, the microprocessor will proceed along the no path out of step 84 to step 80 and again read the scan range and thereafter determine whether the scan range is at the scan range limit in a step 82. Referring to step 70, in the event that there is no device response at the scan address, the microprocessor will also proceed to step 80 and inquire as to whether the scan range has been exceeded in step 82. It is to be appreciated that at some point either the scan range is going to have been exceeded or the master controller will have encountered another master controller. In either event, the microprocessor for the inquiring master controller will proceed to step 86 and process the zone control information that has been received from the scanned zone controllers associated with the particular master controller.

Figure 7:
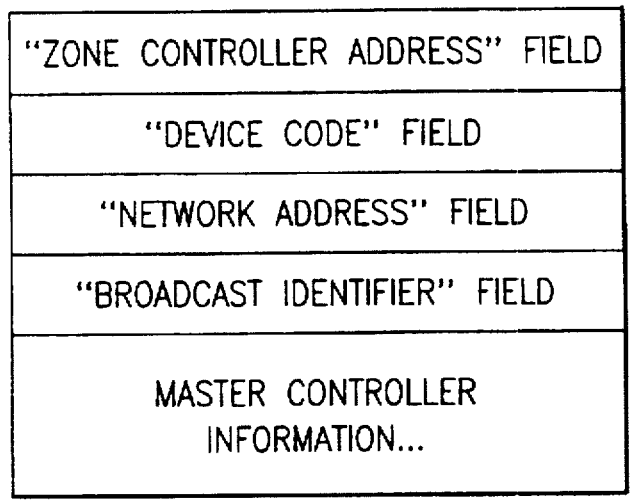
FIG. 7 is an illustration of the configuration of a data packet transmitted by a master controller over the communication network set forth in FIG. 1.

The microprocessor proceeds from processing the control information from all scanned zone controllers to a step 88 wherein a control routine is executed for controlling the heating/cooling system associated with the master controller. This control routine will take into account any change in control parameters for the particular heating/cooling system dictated by the processed zone control information of step 86. Following execution of the control routine, the microprocessor for the particular master controller will proceed to a step 90 and update the master controller's packet, which is normally sent to the zone controllers. An example of how such a master data packet is preferably configured is illustrated in FIG. 7. This master data packet is seen to include the following fields: a zone address field, a device code field, a network address field and, finally, a broadcast field. The zone address field will preferably be blank. The device code field will contain a code indicating that the packet is from a master controller. The "network address" field will contain the particular master controller's network address. The "broadcast field" will contain a general broadcast code indicating that the master controller packet is being simultaneously made available to all zone controllers. The master controller will proceed from step 90 to a step 92 and transmit the thus formed master controller packet on the network communication bus 10. As will be explained in detail hereinafter, each zone controller attached to the communication bus 10 will download the master controller packet and read the aforementioned fields of information to determine the relevance of the packet to the particular zone controller.

The master controller's microprocessor will proceed from step 92 to a step 94 and reset the scan timer before proceeding to a broadcast by exception routine in a step 96. It is to be appreciated that while the microprocessor proceeds to the thus noted routine, the scan timer that has been reset in step 94 will again begin to clock its scan time. It is to be appreciated that the scan program will execute frequently so as to continually note whether the scan timer indicates an elapse of the scan time. Until the scan time has elapsed, the microprocessor will simply exit step 62 and proceed to the broadcast by exception routine of step 96.

Figure 8:
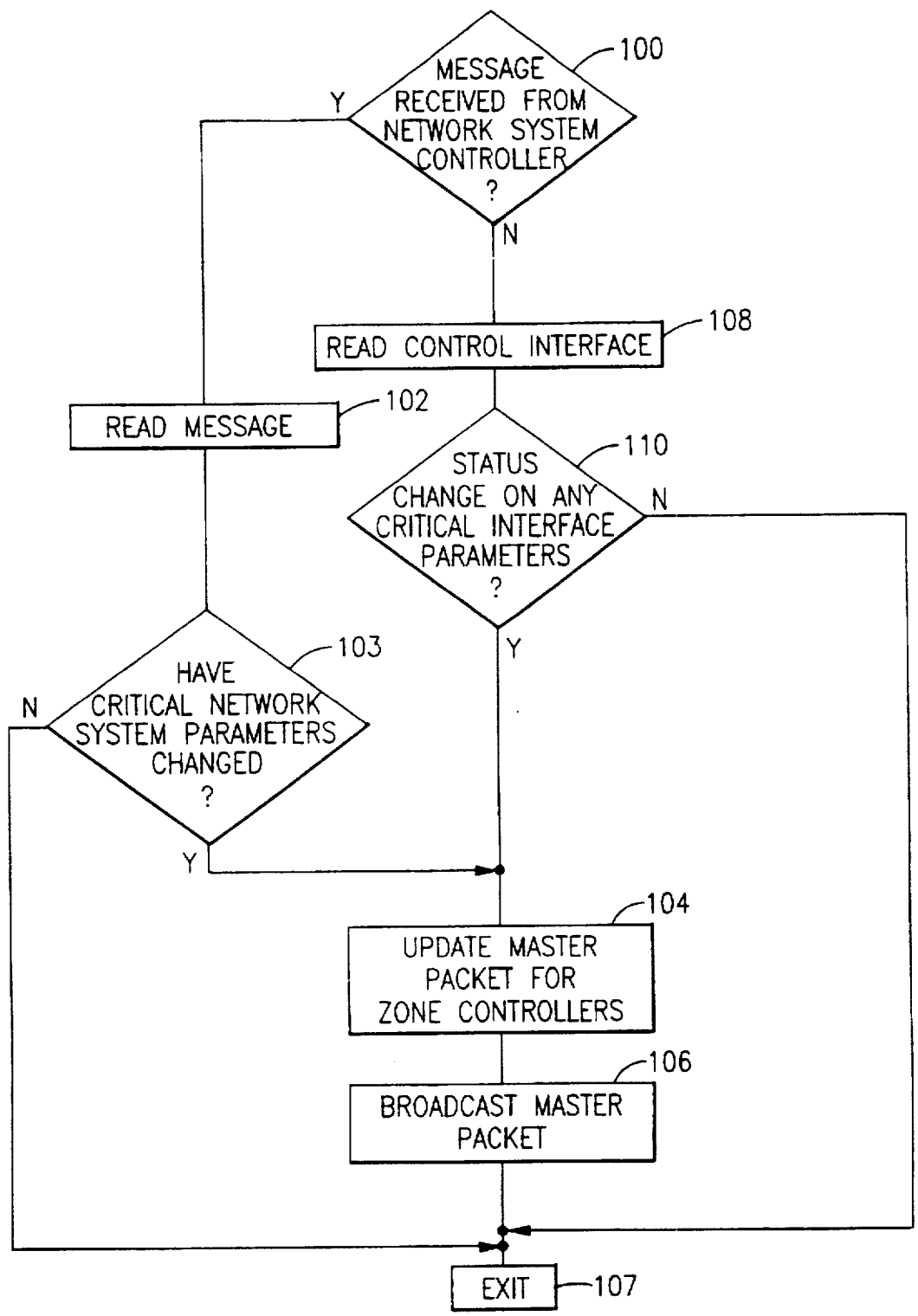
FIG. 8 is a flowchart of a broadcast software routine executable by the microprocessor of FIG. 3.

Referring now to FIG. 8, the "broadcast by exception" routine executed by each master controller is illustrated. This routine begins with a step 100 wherein an inquiry is made as to whether or not a message has been received from the network system controller 32. It will be remembered that the network system controller 32 is simply a network control device attached to the network communication bus 10 in FIG. 1. This network system controller could be any of a number of different devices attached to the communication bus 10 so as to establish a communication capability with one or more master controllers or any other device attached to the communication bus 10. The master controller microprocessor simply notes whether or not a message has been received from such a device. In the event that a message has been received from the network system controller, the microprocessor for the master controller will proceed to a step 102 and read the message from the network system controller. It is to be understood that this message could contain, for instance, an emergency shut down notice. Such notice would preferably appear in a field of a data packet received from the network system controller. This field would be read and the status change in the critical network system parameter would be noted in step 103. The microprocessor would proceed in such a case along the yes path to step 104 and update the master controller's data packet. The updated packet may, for instance, include a notice as to the change in the critical network system parameter as the same is to be encoded for purposes of transmission and receipt by each zone controller. This may, for instance, be set forth in a particular field dedicated to emergency messages from the master controller. The updated packet may, in the alternative, contain a specific instruction that changes one or more operating parameters in each zone controller as a result of the noted change of the network system parameter. For example, an instruction for closing the zone damper might issue in the event of a fire emergency message from the network system controller. The updated packet would also include the appropriate information in the device code field, the master address field and the broadcast field as has been previously discussed relative to step 90. The microprocessor for the master controller would immediately send any such updated master packet to the respective zone controllers in a step 106. It is to be appreciated that such a message would not contain a particular address for any zone controller, but would merely have the field coding scheme previously discussed in step 92 of the scan program. Referring again to step 103, in the event that the message from the network system parameter is not critical, the microprocessor would proceed to exit the broadcast by exception routine in a step 107.

Referring again to step 100, in the event that a receipt has not been noted from the network system controller, the microprocessor for the master controller will proceed to a step 108 and read the control interface data for the particular heating/cooling system being controlled by the master controller. The microprocessor will proceed in a step 110 to examine whether a status change has occurred to any critical control interface parameters. Such critical parameters could be for instance the mode of operation such as a fan mode versus heating mode or cooling mode. Any such change in mode of operation would be deemed important enough to require an immediate broadcast to the zone controllers. The master packet would be updated to include such a change in the critical interface parameters in step 104 and the updated packet would be immediately broadcast to the zone controllers in step 106. The microprocessor would thereafter proceed to exit step 107

Referring to FIG. 9, a software program executable by the microprocessor in each zone controller is illustrated. This program begins with a step 120 wherein a microprocessor in a zone controller inquires as to whether a complete packet has been received from the communication bus 10. When this occurs, the microprocessor for the particular zone controller proceeds to a step 122 and reads the zone address field. It will be remembered that data packets from the master controllers on the communication bus 10 will include a zone controller's address in a particular address field if a direct write is to be made to a particular zone controller.

The microprocessor for the particular zone controller will proceed to a step 124 and inquire as to whether or not the value of the read zone address field equals an assigned zone address to the particular zone controller. Assuming that a direct write has been attempted by a master controller to the particular zone controller, then the zone address field will contain the particular zone controllers network address. The yes path will be pursued out of step 124 in this instance and the device code field will be read in a step 126. Inquiry will next be made in a step 128 as to whether the device code identification field indicates that the packet is from a master controller. The microprocessor will proceed to store pertinent information from the packet of received information in a step 132 before exiting from the packet analysis program in a step 134. This information can be used by the zone control microprocessor to, for instance, control the one or more damper motors for the zone. Referring again to step 128, in the event that the device code field does not indicate that a master packet has been received, the microprocessor for the zone controller will proceed out of step 128 to a step 136 and reject the packet of received information. The rejection of a packet will eventually cause the microprocessor to delete the packet that has been received by the zone controller in accordance with well-known means for handling packets of received information.

As will now be explained, the packet analysis program of FIG. 9 can respond to a broadcast packet of information on the communication bus 10 from a respective master controller without having to be specifically addressed. Referring to step 120, when a complete packet is in, the microprocessor for the zone controller will proceed to step 122 and read the zone address field and thereafter inquire as to whether the zone address field is equal to the assigned zone address for the particular zone controller. In the event that this field is blank or the zone address does not correspond to the assigned zone address, the microprocessor will proceed to step 138 and read the broadcast field from the received packet. This field is examined for conformance with the "general broadcast code" used by the master controller to generate the master data packets in either step 90 or step 104. If a general broadcast code is indicated in step 140, the microprocessor proceeds to a step 142 and reads the "device code" field and inquires in a step 144 as to whether the device code field equals the device code set aside for master controllers.

In the event that a device code does equal the master controller code, the microprocessor for a zone controller will proceed to a step 146 and read the "network address" field of the data packet. The microprocessor for the zone controller will next inquire in step 148 as to whether the read network address equals the assigned master address for the particular zone controller. The assigned "master address: for the particular zone controller will have been previously stored in the memory associated with the zone controller's microprocessor. This may, for instance, be done at the time the microprocessor and associated memory for the zone controller are initially programmed to receive and transmit information on the network or at any convenient time thereafter. The assigned master address stored in the zone controller microprocessor's memory will preferably correspond to the network address of the particular master controller that the zone controller is to be associated with. This is, for instance, the network address of the master controller 12 for the zone controllers 16, 18 and 20 and the network address of the master controller 14 for the zone controller 22, 24 and 26. In the event that the read master address from the data packet equals the assigned master address, the microprocessor for the zone controller will proceed to step 132 and store the packet of information for local use. Referring again to step 148, in the event that the master address is not the same as the assigned master address for the particular zone controller, the microprocessor will proceed along the no path to step 136 and reject the packet of information that has been thus analyzed. The microprocessor will then exit the process of FIG. 9 in step 149.

Referring again to step 140, in the event that the broadcast field does not indicate a general broadcast, the microprocessor will proceed from step 140 to step 136 and reject the packet of information before proceeding to exit step 149. Referring to step 144, in the event that the device code does not equal the master code, the microprocessor for the zone controller will proceed to a step 150 and read a "data type" field from the packet. If the "data type" field indicates that it is a data type recognized by the local zone controller, then the microprocessor will proceed through step 152 and store the packet of information for local use in step 142. In the event that the data type field does not indicate a recognized data type, then the microprocessor will proceed along the no path out of step 152 to step 136 and reject the packet before proceeding to the exit step 149. Referring again to step 120, it is to be noted that the microprocessor will often run the packet analysis program of FIG. 9. Each time the program executes, an inquiry will be made as to whether a complete packet of information has been received and stored in the communication buffer established by the zone controller's microprocessor. The microprocessor will proceed to the exit step 149 in the event that a complete data packet is not available for analysis.

It is to be appreciated from the above that a microprocessor in a zone controller will have the ability to either receive a direct write from its master controller or a generally broadcasted message from its master controller. In either event, the zone controller will be operative to store a packet of information from the master controller for the purpose of controlling the local zone. The zone controller can also receive a broadcast from other than its respective master controller and process the thus received packet of information if in fact it corresponds to a data type of packet that is recognized by the zone controller. This allows for a communication in a general broadcast scheme by other than the zone controllers particular master controller.

It is furthermore to be realized that the zone controller can receive a broadcast message from its respective master controller without awaiting a normal of period of communication dictated by the scan program of the master controller. In this regard, the master controller is at any time able to respond to either an emergency message or a critical parameter change at the control interface with respect to the master controller's HVAC system. In either case, a broadcast message is immediately sent in the form of the master data packet from the particular master controller containing information relating to the situation requiring the immediate broadcast.

It is finally to be appreciated that a particular embodiment of the invention has been described. Alterations, modifications and improvements thereto will readily occur to those skilled in the art. Such alterations, modifications and improvements are intended to be part of this disclosure even though not expressly stated herein and are intended to be within the scope of the invention. Accordingly, the foregoing description is by way of example only and the invention is to be limited only by the following claims and equivalents thereto.

What is claimed is:

1. A process of communicating HVAC control information between a master controller for a heating or cooling system and the zone controllers associated with the master controller wherein the zone controllers control the amount of conditioned air to be provided by such heating or cooling system to particular zones to be heated or cooled and wherein the master controller and the zone controllers are linked together by a communication system carrying the HVAC control information between the master controller and the zone controllers, said process comprising the steps of:

sending a message over the communication system from the master controller to the zone controllers wherein said message includes an identification of the master controller;

reading at least a portion of the message at each zone controller wherein said read portion includes the identification of the master controller;

comparing, within each zone controller, the identification of the master controller with a master controller identification assigned to the particular zone controller; and accepting the message at a particular zone controller for use in controlling the amount of conditioned air to be provided to a zone associated with the particular zone controller when the read identification of the master controller equals the assigned master controller identification for the particular zone controller.

2. The process of claim 1 wherein the identification of the master controller is the communication system address of the master controller used by the zone controllers to address the master controller.

3. The process of claim 1 wherein the communication system carrying the HVAC control information between the master controller and the zone controllers associated with the master controller also carries information being communicated by other devices to the zone controllers and wherein said step of sending a message from the master controller to the zone controllers includes the step of:

identifying within the message that the message is from a master controller type of device.

4. The process of claim 3 further comprising the steps of:

checking, at each zone controller, any message received by the zone controller for an identification that the message is from a master controller type of device; and proceeding at each zone controller to read the portion of the message that includes the identification of the master controller when the message received by the zone controller contains the identification that the message is from a master controller type of device.

5. The process of claim 4 further comprising the steps of:

proceeding to check whether the message contains an indication as to the message being a particular data type of message when the message does not contain the identification that the message is from a master controller type of device; and storing, at each zone controller, the message received by the zone controller when the message contains the indication that the message is a particular data type of message.

6. The process of claim 4 wherein said step of sending a message from the master controller to the zone controllers further includes the step of:

identifying within the message that the message is a broadcast type of message.

7. The process of claim 6 further comprising the steps of:

checking at each zone controller whether any message received by the zone controller contains an indication that the message is a broadcast type of message; and proceeding to said step of checking, at each zone controller, any message received by the zone controller for an identification that the message is from a master controller type of device when the message received by the zone controller contains an indication that the message is a broadcast type of message.

8. The process of claim 7 furthermore comprising the step of:

rejecting the message received by the zone controller when the received message does not contain an indication that the message is a broadcast type of message.

9. The process of claim 1 wherein said step of sending a message over the communication system from the master controller to the zone controllers comprises the steps of:

checking for receipt at the master controller of any messages transmitted over the communication system to the master controller; and sending a message over the communication system from the master controller to the zone controllers when the message received by the master controller requires a change in the operation of the zone controllers associated with the master controller wherein the message included the identification of the master controller.

10. The process of claim 9 wherein said step of sending a message from the master controller to the zone controllers when the message received by the master controller requires a change in the operation of the zone controllers associated with the master controller comprises the step of:

identifying within the message that the message is a broadcast type of message.

11. The process of claim 10 further comprising the steps of:

checking the message sent by the master controller at each zone controller for an identification that the message is a broadcast type of message; and proceeding at each zone controller to read the portion of the message that includes the identification of the master controller when the message sent by the master controller includes the identification that the message is a broadcast type of message.

12. The process of claim 11 further comprising the step of:

rejecting at each zone controller the message sent by the master controller when the message does not include the indication that the message is a broadcast type of message.

13. The process of claim 9 wherein the communication system carrying the HVAC control information between the master controller and the zone controllers associated with the master controller also carries messages from other being transmitted messages to the zone controllers and wherein said step of sending a message over the communication system from the master controller to the zone controllers when the message received by the master controller requires a change in the operation of the zone controllers associated with the master controller comprises the step of:

identifying within the message from the master controller that the message is from a master controller type of device.

14. The process of claim 13 further comprising the steps of:

checking at each zone controller any message received by the zone controller for an identification that the message is from a master controller type of device; and proceeding at each zone controller to read the portion of the message that includes the identification of the master controller when the message received by the zone controller contains the identification that the message is from a master controller type of device.

15. The process of claim 14 further comprising the steps of:

proceeding at each zone controller to check whether the message contains an indication as to the message being a particular data type of message when the message does not contain the identification that the message is from a master controller type of device; and storing at each zone controller the message received by the zone controller when the message contains the indication that the message is a particular data type of message.

16. The process of claim 1 wherein said step of sending a message from the master controller comprises the steps of:

periodically collecting local zone control information from each zone controller associated with the master controller;

executing a control routine utilizing the local zone control information collected from the zone controllers in said step of collecting local control information from the zone controllers; and sending a message from the master controller to the zone controllers reflecting the results of said step of executing the control routine utilizing the information collected from the zone controllers wherein the message sent to the zone controllers includes the identification of the master controller.

17. The process of claim 16 wherein said step of sending a message from the master controller furthermore comprises:

reading a scan timer to determine whether a scan time has elapsed;

proceeding to said step of periodically collecting local zone control information from the zone controllers when the scan time has elapsed;

proceeding to said step of checking for the receipt at the master controller of any messages transmitted over the communication system to the master controller when the scan time has not elapsed; and sending a message over the communication system from the master controller to the zone controllers when the message received by the master controller requires a change in the operation of the zone controllers associated with the master controller wherein the message sent to the zone controllers includes the identification of the master controller.

18. A system for communicating HVAC control information between a master controller for a heating or cooling system and the zone controllers associated with the master controller wherein the zone controllers control the amount of conditioned air to be provided by such heating or cooling system to particular zones to be heated or cooled and wherein the master controller and the zone controllers are linked together by a communication bus carrying the HVAC control information between the master controller and the zone controllers, said system comprising:

means, within the master controller, for sending a message over the communication bus from the master controller to the zone controllers wherein said message includes an identification of the master controller;

means, within each zone controller, for reading at least a portion of the message wherein said read portion includes the identification of the master controller;

means, within each zone controller, for comparing the identification of the master controller with a master controller identification assigned to the particular zone controller; and means, within each zone controller, for accepting the message at the particular zone controller for use in controlling the amount of conditioned air to be provided to a zone associated with the particular zone controller when the read identification of the master controller equals the assigned master controller identification for the particular zone controller.

19. The system of claim 18 wherein the identification of the master controller is the address of the master controller used by the zone controllers to address the master controller.

20. The system of claim 18 wherein the communication bus carrying the HVAC control information between the master controller and the zone controllers associated with the master controller also carries information being communicated by other devices to the zone controllers and wherein said means for sending a message over the communication bus to the zone controllers includes:

means for identifying within the message that the message is from a master controller type of device.

21. The system of claim 20 further comprising:

means within each zone controller for checking any message received by the zone controller for an identification that the message is from a master controller type of device; and means within each zone controller for reading the portion of the message that includes the identification of the master controller when the message received by the zone controller contains the identification that the message is from a master controller type of device.

22. The system of claim 21 further comprising:

means within each zone controller for proceeding to check whether the message contains an indication as to the message being a particular data type of message when the message does not contain the identification that the message is from a master controller type of device; and means within each zone controller for storing the message received by the zone controller when the message contains the indication that the message is a particular data type of message.

23. The system of claim 21 wherein said means for sending a message from the master controller to the zone controllers further includes:

means for identifying within the message that the message is a broadcast type of message.

24. The system of claim 23 further comprising:

means within each zone controller for checking whether any message received by the zone controller contains an indication that the message is a broadcast type of message; and means within each zone controller for proceeding to check any message received by the zone controller for an identification that the message is from a master controller type of device when the message received by the zone controller contains an indication that the message is a broadcast type of message.

25. The system of claim 24 furthermore comprising:

means within each zone controller for rejecting the message received by the zone controller when the received message does not contain an indication that the message is a broadcast type of message.

26. The system of claim 18 wherein said means for sending a message over the communication bus from the master controller to the zone controllers comprises the steps of:

- means within the master controller for checking for receipt at the master controller of any messages transmitted over the communication bus to the master controller; and
- means within the master controller for sending a message over the communication bus to the zone controllers when the message received by the master controller requires a change in the operation of the zone controllers associated with the master controller wherein the message included the identification of the master controller wherein the message includes the identification of the master controller.

27. The system of claim 26 wherein means of sending a message over the communication bus to the zone controllers when the message received by the master controller requires a change in the operation of the zone controllers associated with the master controller comprises:

- means, within the master controller, for identifying within the message that the message is a broadcast type of message.

28. The system of claim 27 further comprising:

- means, within each zone controller, for checking the message sent by the master controller for an identification that the message is a broadcast type of message; and
- means, within each zone controller, for proceeding to read the portion of the message that includes the identification of the master controller when the message sent by the master controller includes the identification that the message is a broadcast type of message.

29. The system of claim 28 further comprising the step of:

- means, within each zone controller for rejecting the message sent by the master controller when the message does not include the indication that the message is a broadcast type of message.

30. The system of claim 26 wherein the communication bus carrying the HVAC control information between the master controller and the zone controllers associated with the master controller also carries messages being transmitted from other devices to the zone controllers and wherein means for sending a message over the communication bus to the zone controllers when the message received by the master controller requires a change in the operation of the zone controllers associated with the master controller comprises:

- means for identifying within the message from the master controller that the message is from a master controller type of device.

31. The system of claim 30 further comprising:

- means within each zone controller for checking any message received by the zone controller for an identification that the message is from a master controller type of device; and
- means within each zone controller for proceeding to read the portion of the message that includes the identification of the master controller when the message received by the zone controller contains the identification that the message is from a master controller type of device.

32. The system of claim 31 further comprising:

- means within each zone controller for proceeding to check whether the message contains an indication as to the message being a particular data type of message when the message does not contain the identification that the message is from a master controller type of device; and
- storing at each zone controller the message received by the zone controller when the message contains the indication that the message is a particular data type of message.

33. The system of claim 18 wherein means for of sending a message over the communication bus to the zone controllers comprises:

- means, within the master controller, for periodically collecting local zone control information from each zone controller associated with the master controller;
- means, within the master controller, for executing a control routine utilizing the local zone control information collected from the zone controllers; and
- means, within the master controller, for sending a message to the zone controllers reflecting the results of said step of executing the control routine utilizing the information collected from the zone controllers wherein the message sent to the zone controllers includes the identification of the master controller wherein the message sent to the zone controllers includes the identification of the master controller.

34. The system of claim 33 wherein means for sending a message from the master controller furthermore comprises:

- means, within the master controller, for reading a scan timer to determine whether a scan time has elapsed;
- means, within the master controller, for proceeding to periodically collect local zone control information from the zone controllers when the scan time has elapsed;
- means, within the master controller, for proceeding to checking for the receipt at the master controller of any messages transmitted over the communication bus to the master controller when the scan time has not elapsed; and
- means, within the master controller, for sending a message over the communication bus to the zone controllers when the message received by the master controller requires a change in the operation of the zone controllers associated with the master controllers wherein the message sent to the zone controllers includes the identification of the master controller wherein the message sent to the zone controllers includes the identification of the master controller.

* * * * *